(No Model.)
J. A. KIENARDT & W. R. FUNK.
HORSE HAY RAKE.
No. 340,326. Patented Apr. 20, 1886.
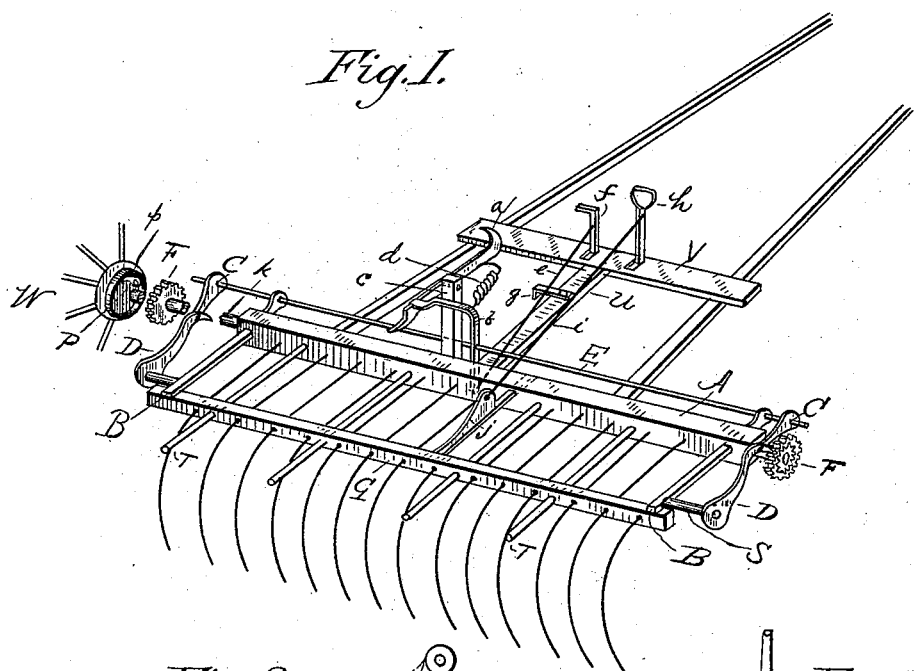
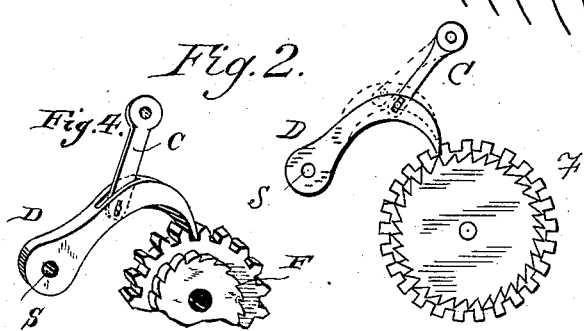
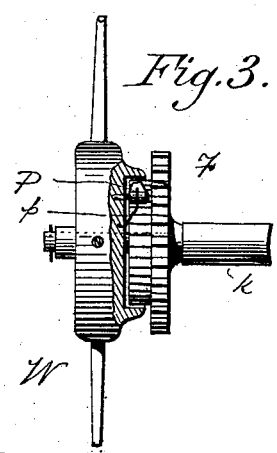
Witnesses
Wm H Jones
N. Bickford
Inventors
John A. Kienardt
William R. Funk

UNITED STATES PATENT OFFICE.

JOHN A. KIENARDT AND WILLIAM R. FUNK, OF DAYTON, OHIO.

HORSE HAY-RAKE.

SPECIFICATION forming part of Letters Patent No. 340,326, dated April 20, 1886.

Application filed August 27, 1885. Serial No. 175,488. (No model.)

*To all whom it may concern:*

Be it known that we, JOHN A. KIENARDT and WILLIAM R. FUNK, citizens of the United States, residing at the city of Dayton and State of Ohio, have invented certain new and useful Improvements in Horse Hay-Rakes; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to improvements in hay-rakes in which a series of curved teeth trailing behind a wheeled frame are raised to drop a windrow or load of collected hay by means of the draft animals, stripping-fingers being used for clearing the hay from the rake-teeth.

The object of the invention is to provide a simple and effective mechanism for operating the rake-teeth and clearer-fingers by means of draft force and devices under the control of the driver, these devices being so arranged that the teeth are held in position for collecting the hay, and raised to discharge the load by means of draft force, applied as hereinafter described and claimed. We attain this object by the mechanism shown by the accompanying drawings, in which—

Figure 1 represents a perspective view of our device in position for dumping the collected hay, a part of one ground-wheel only being shown. Fig. 2 represents a side view of the trip part of our dumping device. Fig. 3 is a detail view showing the connection of the combined spur and ratchet wheel with the hub of the ground-wheel. Fig. 4 is a detail view in perspective, showing a modified form of connecting the arm and dog.

Similar letters refer to similar parts throughout the several views.

The letter A represents the rake-head and axle-beam for ground-wheels, at either end of which are cross-bars B B, connecting cross-bar G to it. Cross-bars B B also serve as standards to receive rod E, and have projecting spindles S, on which dogs D D turn.

C C are oscillating arms, pinned or fastened to rod E at either end, and engaging in the slotted heads of dogs D D. The pins of arms C C play in transverse slots in dogs D D, to permit the up and down movement of dogs D D. (See Fig. 2.) Dogs D D are swung to arms C C at one end and pivoted on the projecting spindles S of bars B B at the other end, and are so shaped at the extreme points as to be received between the teeth on the peripheries of wheels F F, and they are adapted to be held out of engagement with said wheels by the spring $d$, mentioned below.

F F are loose combined spur and ratchet wheels, revolving with the ground-wheels on axle $k$, provided with leaves or teeth to receive the dogs D D. The ratchet portions on these wheels form projecting shoulders, fitting into hollow disks in the sides of the hubs of the ground-wheels, thus leaving a circular space between, which pawl P, pinned to the hub and held in engagement by means of a spring, $p$, compels the ratchet-wheels to revolve with the ground-wheels.

In Fig. 1 of the drawings the broken ground-wheel and one ratchet wheel on a broken spindle are moved out to better show this construction. Both ground-wheels being constructed alike in this particular, it will be seen that the rake may be dumped independently by each, as in turning a corner, when one of the ground-wheels is still, or nearly so, and we have what is known as a right and left dump.

$a$ is an elbow-catch, pivoted to standard $c$ to swing in a perpendicular plane, notched in one end to engage with holding-lever $b$, which in turn acts as a lever to turn or oscillate rod E, and is connected at its lower end by rod $e$ to an independent foot-lever, $f$.

$c$ is an ordinary standard fastened to the rake-head.

$d$ is a spiral spring connecting elbow-catch $a$ at its other end with lever $b$ at its upper end, and adapted to hold dogs D D out of engagement with the ratchet-wheels when lever $f$ does not operate.

$g$ is any ordinary iron plate located in the track of elbow-catch $a$, to cause a release of lever $b$ in dumping. When lever $f$ is pressed forward by the driver, holding-lever $b$ is locked into the notch of elbow-catch $a$, and rod E, turning backward at the same time, causes dogs D D to drop into the leaves or teeth of wheels F F, held by pawls in wheels W W, and turning with them, the whole dumping device turning forward by the draft force, releasing the collected hay, until elbow-catch $a$ at its hooked end strikes plate $g$, fastened to the rake-frame and in its track, causing a release of lever $b$ and a return of the rake-teeth to a working position.

$h\ i\ j$ form an independent lifting-lever to lift the rake-teeth, and operates independently of the devices heretofore described.

T T T T are the ordinary rake-stripping fingers.

U and V are portions of the ordinary rake-frame.

If desired, the arms may play within a vertical slot in the head of the dogs, instead of at one side. (See Fig. 4.)

Having fully described our invention, what we claim is—

1. The combination, with the oscillating rod, of the notched catch and the lever connected thereto by a spring, the pull-rod and its foot-lever, the arms and dogs raised and lowered by said oscillating rod, the rake head and teeth, and the ground-wheel axle provided with means, substantially as shown, for engaging with the dogs to dump the rake-head, as set forth.

2. The combination, with rod E on the rake-head, of the notched catch $a$ and lever $b$, connected by spring $d$, the rod $e$ and foot-lever $f$, the arms and dogs C C D D, adapted to be raised and lowered by rod E, the rake-head A and its teeth, the combined loose spur and ratchet wheels F and axle $k$, and the ground-wheels W, provided in their hubs with a spring-pawl, P $p$, as set forth.

JOHN A. KIENARDT.
WILLIAM R. FUNK.

Witnesses:
CHAS. H. FINCH,
HARRY F. NOLAN.